(12) United States Patent
Jiang et al.

(10) Patent No.: US 11,172,544 B1
(45) Date of Patent: Nov. 9, 2021

(54) SYSTEMS AND METHODS FOR TRANSFERRING WIRELESS POWER AND DATA FOR A 5G WIRELESS ACCESS POINT

(71) Applicant: Inseego Corp., San Diego, CA (US)

(72) Inventors: John Jiang, San Diego, CA (US); Stephen Sek, San Diego, CA (US); Vishal Donthireddy, San Diego, CA (US); James Kappes, San Diego, CA (US)

(73) Assignee: Inseego Corp., San Diego, CA (US)

( * ) Notice: Subject to any disclaimer, the term of this patent is extended or adjusted under 35 U.S.C. 154(b) by 0 days.

(21) Appl. No.: 16/938,891

(22) Filed: Jul. 24, 2020

(51) Int. Cl.
| H04W 88/08 | (2009.01) |
| H02J 50/10 | (2016.01) |
| H04W 84/12 | (2009.01) |
| H04W 84/04 | (2009.01) |

(52) U.S. Cl.
CPC ............ *H04W 88/08* (2013.01); *H02J 50/10* (2016.02); *H04W 84/042* (2013.01); *H04W 84/12* (2013.01)

(58) Field of Classification Search
CPC ...... H04W 88/08; H04W 84/042; H02J 50/10
See application file for complete search history.

(56) References Cited

U.S. PATENT DOCUMENTS

| 10,326,519 B2* | 6/2019 | Khan ................. H04B 7/15507 |
| 2019/0320494 A1* | 10/2019 | Jayawardene ........ H04L 5/0041 |
| 2020/0008230 A1* | 1/2020 | Yu ......................... H04L 5/0055 |
| 2020/0091778 A1* | 3/2020 | Liao ....................... H02J 50/12 |
| 2020/0169049 A1* | 5/2020 | Chiu ................... H04L 12/2836 |

* cited by examiner

*Primary Examiner* — Brandon J Miller
(74) *Attorney, Agent, or Firm* — Sheppard, Mullin, Richter & Hampton LLP; Hector A. Agdeppa; Daniel N. Yannuzzi (57) ABSTRACT

A 5G wireless access point, includes: an outdoor unit comprising a 5G modem and a wireless power receive unit, and configured to be affixed to an exterior surface of a building component of a building; an indoor unit comprising a wireless power transmit unit and configured to be affixed to an interior surface of the building component at a location opposite the outdoor unit on an interior surface of the building component; and a Wi-Fi router communicatively coupled to the 5G modem and configured to transmit or receive information wirelessly with a device within the building. The wireless power transmit unit of the indoor unit may provide power to operate the outdoor unit via a wireless link between the wireless power transmit unit and the wireless power receive unit.

21 Claims, 9 Drawing Sheets

SYSTEMS AND METHODS FOR TRANSFERRING WIRELESS POWER AND DATA FOR A 5G WIRELESS ACCESS POINT

DESCRIPTION OF RELATED ART

Wireless communications have become ubiquitous in today's society as wireless systems capabilities increase so does the adoption rate of wireless technologies. Today, wireless technologies are fast overtaking and replacing conventional wired technologies and infrastructure.

The 5G broadcast transmission protocol devised by the $3^{rd}$ Generation Partnership Project (3GPP) represents the latest in wireless communication technologies promising to revolutionize wireless data communications. 5G high-band technologies utilize extremely high frequency (EHF), or millimeter wave, that enables connectivity significantly improved over the previous generation 4G networks. 5G provides greater spectral efficiency and greater spectrum pathways to achieve increased throughput for each part of the spectrum.

While millimeter wave frequencies allow greater bandwidth, these frequencies suffer from decreased range as compared to their longer wavelength, lower frequency predecessors. Millimeter wave frequencies also suffer from greater attenuation when traveling through walls, windows and other structural components. Accordingly, 5G networks typically require a higher density of transmitters as compared to 4G network architectures.

BRIEF SUMMARY OF THE DISCLOSED TECHNOLOGY

According to various implementation of the disclosed technology systems and methods may be implemented to provide a 5G wireless access point that may include: an outdoor unit comprising a 5G modem and a wireless power receive unit, and configured to be affixed to an exterior surface of a building component of a building; an indoor unit comprising a wireless power transmit unit and configured to be affixed to an interior surface of the building component at a location opposite the outdoor unit on an interior surface of the building component; and a Wi-Fi router communicatively coupled to the 5G modem and configured to transmit or receive information wirelessly with a device within the building; wherein the wireless power transmit unit of the indoor unit provides power to operate the outdoor unit via a wireless link between the wireless power transmit unit and the wireless power receive unit.

In various embodiments, the Wi-Fi router is located in the outdoor unit, while in other embodiments, the Wi-Fi router is located in the indoor unit.

The 5G modem and the Wi-Fi router further may include a wireless interface to exchange data wirelessly between the 5G modem in the outdoor unit and the Wi-Fi router in the indoor unit. As a result of wireless coupling between the outdoor unit and the indoor unit, the 5G wireless access point may be configured to be installed without requiring physical penetration of the building component.

In various embodiments, the 5G modem may be configured to be mounted external to the building such that the 5G modem receives millimeter wave 5G signals without requiring those millimeter wave 5G signals to penetrate the building. In various embodiments, the 5G wireless access point is configured to be installed without requiring physical penetration of the building component. In various embodiments, the building component may include an exterior window, wall or door of the building.

A method of operation of a 5G wireless access point that may include an outdoor unit affixed to an exterior surface of a building component of a building and an indoor unit affixed to an interior surface of the building component opposite the outdoor unit on an interior surface of the building component, may include: a wireless power transmit unit of the indoor unit of the 5G wireless access point receiving power from a power source, energizing a wireless power transmitting unit with the received power, and transmitting AC power from the power transmitting unit; a wireless power receive unit of the outdoor unit of the 5G wireless access point receiving AC power transmitted from the wireless power transmit unit, using this received AC power to provide power to a 5G wireless modem of the outdoor unit; the 5G modem of the outdoor unit receiving 5G wireless signals containing data from a 5G base station and transferring the data received by the 5G modem to a Wi-Fi router; and the Wi-Fi router transmitting the transferred data received from the 5G modem wirelessly to devices within the building. The building component may include an exterior window, wall or door of the building.

The Wi-Fi router may be located at the indoor unit, and the 5G modem transferring data in the 5G wireless signals received by the 5G modem to the Wi-Fi router, may include modulating the data onto a wireless carrier and transmitting the data wirelessly to the Wi-Fi router at the indoor unit.

The Wi-Fi router may be located at the outdoor unit, and the 5G modem transferring data in the 5G wireless signals received by the 5G modem to the Wi-Fi router, may include transmitting the data over a wired or wireless interface to the Wi-Fi router at the outdoor unit.

The method may further include determining a level of power required at a transmit coil of the wireless power transmit unit to transmit sufficient energy from the wireless power transmit unit to the wireless power receive unit and dynamically adjusting a power level of the wireless power transmit unit based on the determined level of power required.

Determining a level of power required to transmit sufficient energy from the wireless power transmit unit to the wireless power receive unit may include the wireless power receive unit measuring a magnetic field strength of energy received at the wireless power receive unit to determine whether the level of power at a transmit coil of the wireless power transmit unit is sufficient to transmit sufficient energy from the wireless power transmit unit to the wireless power receive unit.

The method may further include the wireless power receive unit transmitting information to the wireless power transmit unit, the information indicating the measured magnetic field strength of the energy received at the wireless power receive unit.

The wireless power receive unit transmitting information to the wireless power transmit unit may include the wireless power receive unit transmitting across a wireless communication link between the wireless power receive unit and the wireless power transmit unit.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not exhaustive and do not limit the disclosure or the disclosed embodiments to the precise form disclosed.

DETAILED DESCRIPTION OF THE EMBODIMENTS

Embodiments of the technology disclosed herein are directed toward devices and methods for providing a 5G wireless access point configured to transmit and receive millimeter wave wireless 5G signals from a 5G base station and to relay these signals to/from one or more devices within a building wirelessly. More particularly, some embodiments include an outdoor unit and an indoor unit configured to be mounted proximate one another on opposite sides of a building component, such as a window, wall, door or other building component. The outdoor unit includes a 5G wireless access point to communicate with one or more 5G base stations wirelessly. The outdoor unit also includes a wireless power receive unit including one or more receive coils to receive wireless electromagnetic AC signals. Because the 5G modem is configured to be mounted external to the building, in various embodiments the 5G modem receives millimeter wave 5G signals without requiring those millimeter wave 5G signals to penetrate the building.

The indoor unit includes a wireless power transmit unit that takes power from a power source, such as an AC mains source within the building (or other power source), conditions that power if necessary, and uses it to power a wireless power transmit unit including one or more transmit coils to transmit wireless electromagnetic AC signals to the corresponding coils in the wireless power receive unit of the outdoor unit. Accordingly, the outdoor unit can operate using power supplied by the indoor unit over the wireless electromagnetic link between the transmit coils and receive coils. As such, applications can be implemented in which the outdoor unit does not require a separate source of power beyond the wireless power receive unit. Power from inside the building can be used to supply power to the wireless power transmit unit, which in turn supplies power to the wireless power receive unit. Because of the wireless power transfer link, the outdoor unit can be installed on the outside of a building and receive power from the indoor unit inside the building without requiring physical penetration of the building component.

A wireless access point such as a Wi-Fi wireless router can be communicatively coupled to the 5G modem via a wireless or hardwired interface. The Wi-Fi wireless router can receive information from the 5G modem and relay or transmit that information to one or more wireless devices within or nearby outside the building that are in communicative contact with the Wi-Fi wireless router. Likewise, the Wi-Fi wireless router can receive information from these one or more devices and transfer that information to the 5G modem via the same or a different wireless or hardwired interface.

The Wi-Fi wireless router can be configured as part of the outdoor unit or as part of the indoor unit. In implementations in which the Wi-Fi wireless router is part of the outdoor unit, a hardwired or wireless interface can be implemented between the Wi-Fi wireless router and the 5G modem to allow this data transfer to occur in either or both directions. In implementations in which the Wi-Fi wireless router as part of the indoor unit, a wireless interface can be implemented between the Wi-Fi wireless router and the 5G modem to allow this data transfer to occur in either or both directions. For example, in some applications Bluetooth, Zigbee or other radios can be used to provide wireless communications between the 5G modem and the Wi-Fi wireless router. Other wireless communication protocols may be used as well.

Figure 1:
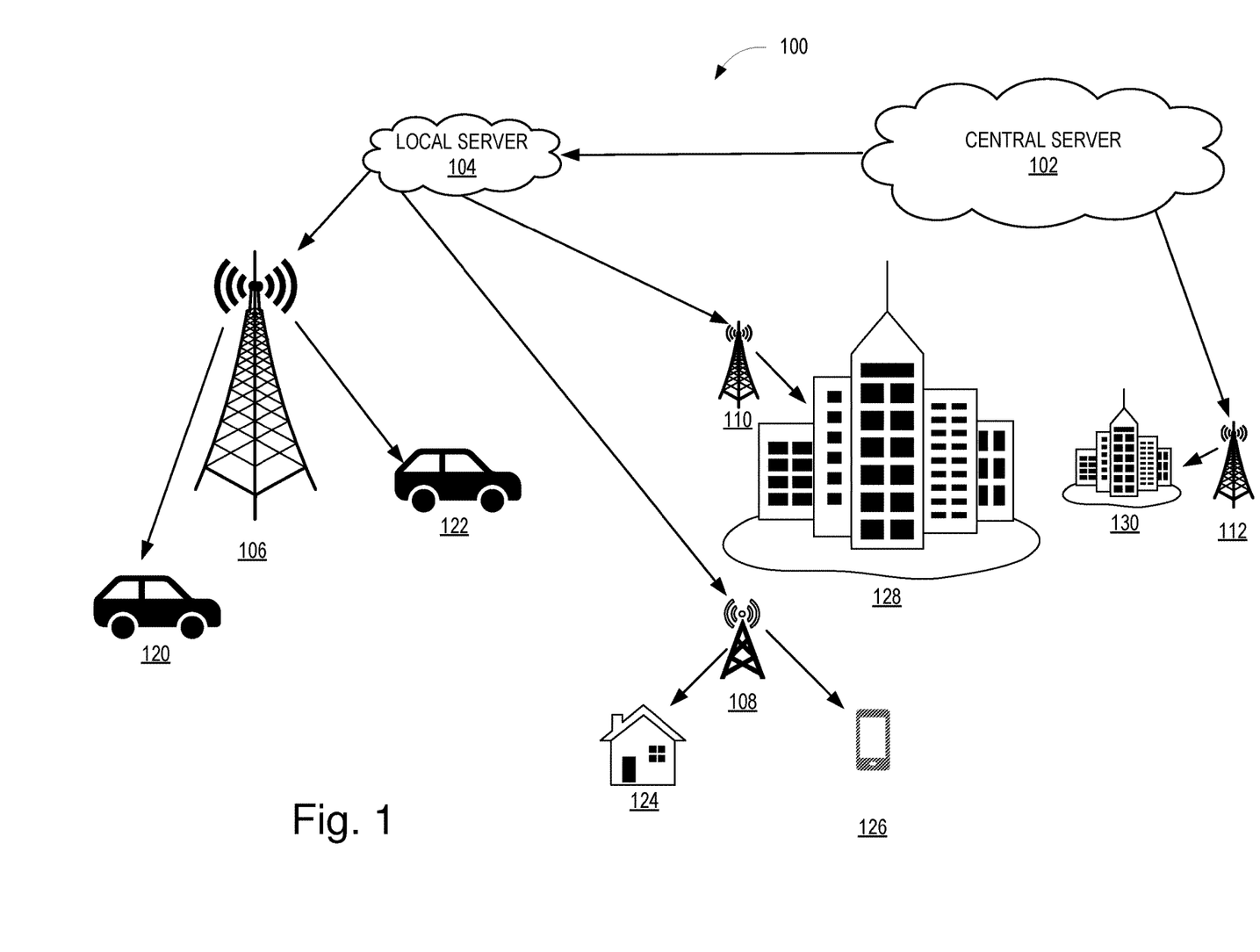
FIG. 1 illustrates an example 5G network with which various embodiments of the present disclosure may be implemented.

Before describing example embodiments in detail, it is useful to describe an example environment with which various embodiments may be implemented. FIG. 1 illustrates an example 5G network 100 in which or with which various embodiments of the present disclosure may be implemented. 5G is a standard promulgated by the International Telecommunication Union (ITU) and the $3^{rd}$ Generation Partnership Project (3GPP), with the ITU setting the minimum requirements for 5G compliance, and the 3GPP creating the corresponding specifications. 5G is a successor to the 4G/Long Term Evolution (LTE) standard, and refers to the fifth generation of wireless broadband technology for digital cellular networks. 5G is intended to replace or augment 4G/LTE. Touted advantages of 5G include, for example, up to 10 times faster download and upload speeds, along with much-reduced latency (also referred to as "air latency," i.e., the roundtrip time it takes for a device to communicate with the network).

The frequency spectrum of 5G includes three bands. The first band can be referred to as the low-band spectrum, i.e., the sub-1 GHz spectrum. This low-band spectrum is the primary band used by U.S. wireless carriers with data speeds reaching about 100 Mbps. The second band can be referred to as the mid-band spectrum, i.e., the sub-6 GHz spectrum, which provides lower latency (e.g., 4-5 ms) and greater data speeds (e.g., up to 1 Gbps) relative to the low-band spectrum. However, mid-band signals are not able to penetrate structures, such as buildings, as effectively as low-band signals. The third band can be referred to as the high-band spectrum, or millimeter wave (mmWave), and operates between 25 GHz and 100 GHz. The term millimeter is associated with this high-band spectrum because wavelengths in this portion of the spectrum range from, e.g., 1-10 mm. Devices operating on this third band can deliver the highest data speed (e.g., up to 10 Gbps) and the lowest latency (e.g., 1 ms). However, its coverage area (the distance it can transfer data) is less than that of the low-band and mid-band spectrums, and building penetration decreases as the frequency increases. Use of mmWave technology is nevertheless desirable because the low-band and mid-band portions of the spectrum are already heavily congested with, e.g., TV and radio signals, as well as 4G/LTE traffic, and so long as the coverage area can be limited, the benefits of mmWave technology can still be realized.

With Reference Now to FIG. 1, a mobile network's RAN may include various infrastructure, e.g., base stations/cell towers, masts, in-home/in-building infrastructure, and the like. The RAN allows users of mobile devices, e.g., smartphones, tablet computers, laptops, vehicle-implemented communication devices (e.g., vehicles having vehicle-to-vehicle (V2V) capabilities), to the core network. The example of FIG. 1 illustrates a plurality of 5G small base stations or small cells and 5G macro base stations or macro cells, i.e., 5G macro cells 106, 110, and 112, and 5G small cell 108.

Macro cells can refer to (tall, high-powered) "macro" base stations/cell towers that are able to maintain network signal strength across long/large distances. 5G macro cells may use multiple input, multiple output (MIMO) antennas that may have various components that allow data to be sent and/or received simultaneously. In the example 5G network 100 of FIG. 1, 5G macro cell 106 may provide wireless broadband coverage/communications to vehicles 120 and 122. 5G macro cell 110 may provide broadband service to an area, such as a city or municipality 128. Likewise, 5G macro cell 112 may provide broadband coverage to an area, such as a city or municipality 130. The MIMO antennas used by 5G macro cells may comprise large numbers of antenna elements, which can be referred to as massive MIMO, whose size may be comparable to, e.g., 3G and/or 4G base station antennas.

5G small cells can refer to wireless transmitters/receivers implemented as micro base stations designed to provide coverage to areas smaller than those afforded coverage by 5G macro cells, e.g., on the order of about 100 m to 200 m for outdoor 5G small cells. Indoor 5G small cell deployments may be on the order about 10 m. 5G small cells can be mounted or integrated into/onto street lights, utility poles, buildings, etc., and like 5G macro cells, may also leverage massive MIMO antennas. In the example 5G network 100 of FIG. 1, 5G small cell 108 provides broadband coverage to a house 124 and smartphone 126.

The core network may comprise the mobile exchange and data network used to manage the connections made to/from/via the RAN. As illustrated in FIG. 1, the core network of 5G network 100 may include central server 102 and local server 104. Central server 102 is shown to effectuate broadband service to municipality 130 by way of 5G macro cell 112. Central server 102 may also operatively connect to local server 104, which in turn, provides broadband connectivity by way of 5G macro cells 106 and 110, as well as 5G small cell 108. The use of distributed servers, such as local server 104 can improve response times, thereby reducing latency.

The core network may leverage network function virtualization (instantiation of network functions using virtual machines via the cloud rather than hardware) and network slicing (segmentation of 5G network 100 in accordance with a particular application, industry, or other criteria) to provide these lower response times, and provide faster connectivity.

Figure 2:
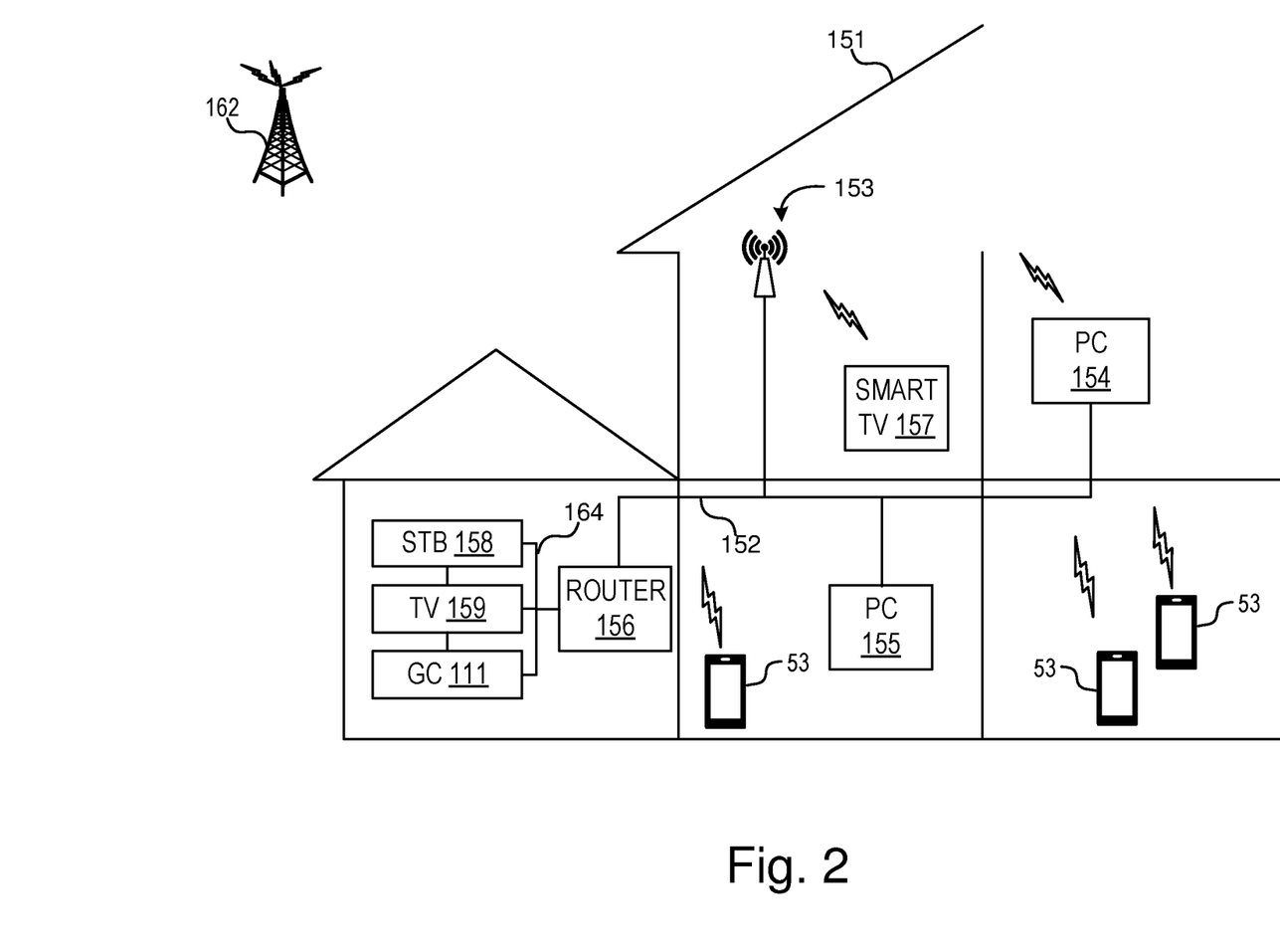
FIG. 2 illustrates an example of an in-home wireless and wired network with which various embodiments may be implemented.

FIG. 2 illustrates an example of an in-home wireless and wired network with which various embodiments may be implemented. The example of FIG. 2 shows a wired and wireless network operating within a building 151 (e.g., house 124 or a building in municipality 128 or municipality 130). Building 151 may include a house, and apartment, an office suite or building, a warehouse, a retail establishment or other commercial, residential or government building.

This example includes a wired network implemented using a wired communications medium 152. In some embodiments, the wired communications medium might be a fiber optic cable system, an Ethernet cable system, a coaxial cable system, a power line system, or other physical communications medium. A wireless access point 153 is included in this example to provide a wireless network over which various devices within the building 151 may communicate wirelessly. For example, wireless access point 153 can function as a Wi-Fi router to create a Wi-Fi network over which the various devices can communicate. Wireless access point 153 may also include functionality to communicate with an external network such as, for example, through a 4G or 5G base station 162 (e.g., a macro cell or small cell). In this example, wireless access point 153 also includes a router so that it can communicate over wired communications medium 152.

This example also illustrates a number of devices that can communicate wirelessly or over wired communications medium 152 as devices on the network. This example includes a number of smart phones 53, a smart TV 157 and a personal computer (PC) 154 that can communicate wirelessly with wireless access point 153. This example also illustrates PC 154, a PC 155 and a router 156 that can communicate with wireless access point 153 via wired communications medium 152. Router 156 can further communicate with a set-top box 158, a television 159 and a gaming console 111 via a wired communications interface 164.

In some implementations, wireless access point 153 may be implemented as a Wi-Fi router for communications with devices within or within proximity of the outside of building 151. Wireless access point 153 may also include a modem such as a 5G modem to communicate with the Internet or other third parties via the 5G communication network. In this manner, the devices in communication with the Wi-Fi or ethernet router of wireless access point 153 may be connected to the Internet or other third parties.

Although various embodiments may be described in terms of this example environment, the technology disclosed herein can be implemented in any of a number of different environments.

Figure 3:
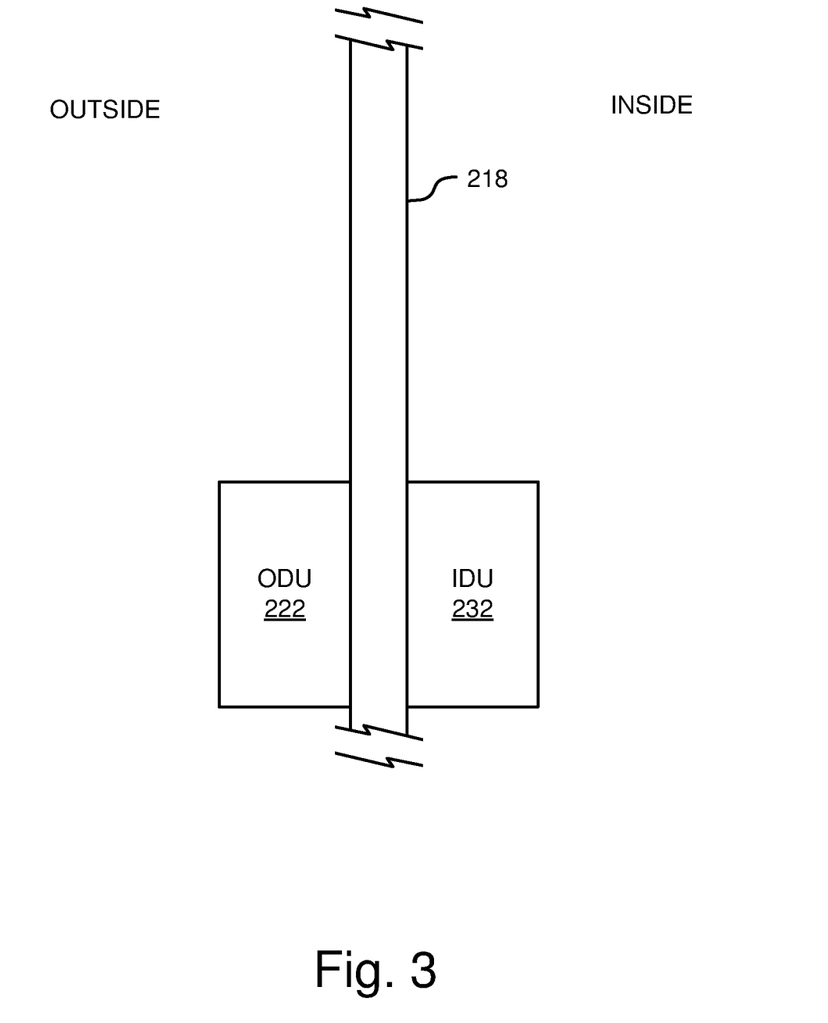
FIG. 3 illustrates a high-level block diagram of an indoor/outdoor 5G wireless access point accordance with one embodiment.

FIG. 3 illustrates a high-level block diagram of an indoor/outdoor 5G wireless access point accordance with one embodiment. The illustrated example includes an outdoor unit 222 affixed to an exterior surface of a building component 218 and an indoor unit 232 affixed to an interior surface of building component 218. As illustrated in this example, outdoor unit 222 and indoor unit 232 are affixed to opposite surfaces of building component 218 proximate one another to provide optimum power transfer from indoor unit 232 to outdoor unit 222. Building component 218 may include, for example, a window, sliding door, French door, standard glass pane(s), low emissivity (low-e) glass pane(s), Plexiglas or transparent surface; a wood, masonry, brick, or other exterior wall; or a door of the building.

As described above, outdoor unit 222 may include a 5G modem to enable it to communicate with one or more 5G base stations external to the building. As a result, millimeter wave signals between the 5G base stations and the 5G modem of outdoor unit 222 need not penetrate building component 218. Therefore, there is no attenuation of millimeter wave signals reaching outdoor unit 222 that would otherwise be caused by having them pass through building component 218.

For mounting on windows or other transparent surfaces, visual alignment can be used to align outdoor unit 222 and indoor unit 232 using line-of-sight alignment. Also, features of the building component, such as corners of a window frame, muntins or mullions can be used to guide alignment. In some embodiments, the receive and transmit coils of outdoor unit 222 and indoor unit 232 are mounted within their respective units at positions such that when the outdoor unit 222 and indoor unit 232 are physically aligned with one another, their respective coils are aligned for optimum power transfer in the mounting environment. For example, the centers of the coils can be positioned in the same location relative to the four perimeter edges of their respective outdoor unit 222 or indoor unit 232 so that physical alignment of the devices leads to alignment of their coils.

For applications on non-transparent building components, physical features of the structure may provide a guide to alignment, such as described above with respect to window frames, muntins or mullions. Some embodiments may measure magnetic field strength of the electromagnetic power signal received at the receive coil and determine the position at which this magnetic field strength is maximized. For example, the installer/user may mount the indoor unit 232 in a desired location and then position the outdoor unit 222 in a location proximate to the indoor unit 232, but on the opposite side of the building component 218. The user can then move the outdoor unit 222 (e.g., up and down or back and forth) while the outdoor unit 222 measures the received magnetic field strength. Indicators on a user interface of outdoor unit 222 can provide positioning guidance to the installer and can inform the installer when a position of maximum magnetic field strength is reached. At that point, the installer can mark the position then affix outdoor unit 222 permanently. In some implementations, the indictor can be a single LED indicating whether the received magnetic field strength is sufficient or not. In other implementations, additional indicators or a display screen can be used to show positioning parameters such as signal level and suggested direction of positioning movement. In some embodiments, the user interface may employ voice prompts or other audible output to prompt the user regarding positioning. Instead of or in addition to a user interface on outdoor unit 222, an app may be provided to run on the installer's smartphone or other device to guide the installer for positioning.

In other embodiments, installation can start by the installer mounting outdoor unit 222 first, then following a similar positioning process as described above, but by moving indoor unit 232 to find an optimal location. Because the received magnetic field strength is detected at outdoor unit 222, information regarding received magnetic field strength can be sent to an app used by the installer, or it can be sent to indoor unit 232 for display or other communication via a user interface of indoor unit 232. Embodiments may employ a Bluetooth interface (or other wired or wireless interface) between outdoor unit 222 and indoor unit 232 to exchange positioning and other housekeeping information between the units.

Various mechanisms can be utilized to affix outdoor unit 222 and indoor unit 232 to building component 218. For example, epoxies, polyurethanes, polyimides, cyanoacrylate, and other glues or adhesives can be provided in various forms. These can include pastes, liquids, films, sprays, pellets, tapes, PSAs, and so on. They can be provided in different types including hot melt, reactive hot melt, thermosetting, pressure sensitive, contact adhesives, and so on. Other fasteners and fastening devices can also be used depending on the composition of building component 218. These may include screws, bolts, nails, rivets, and so on.

Figure 4:
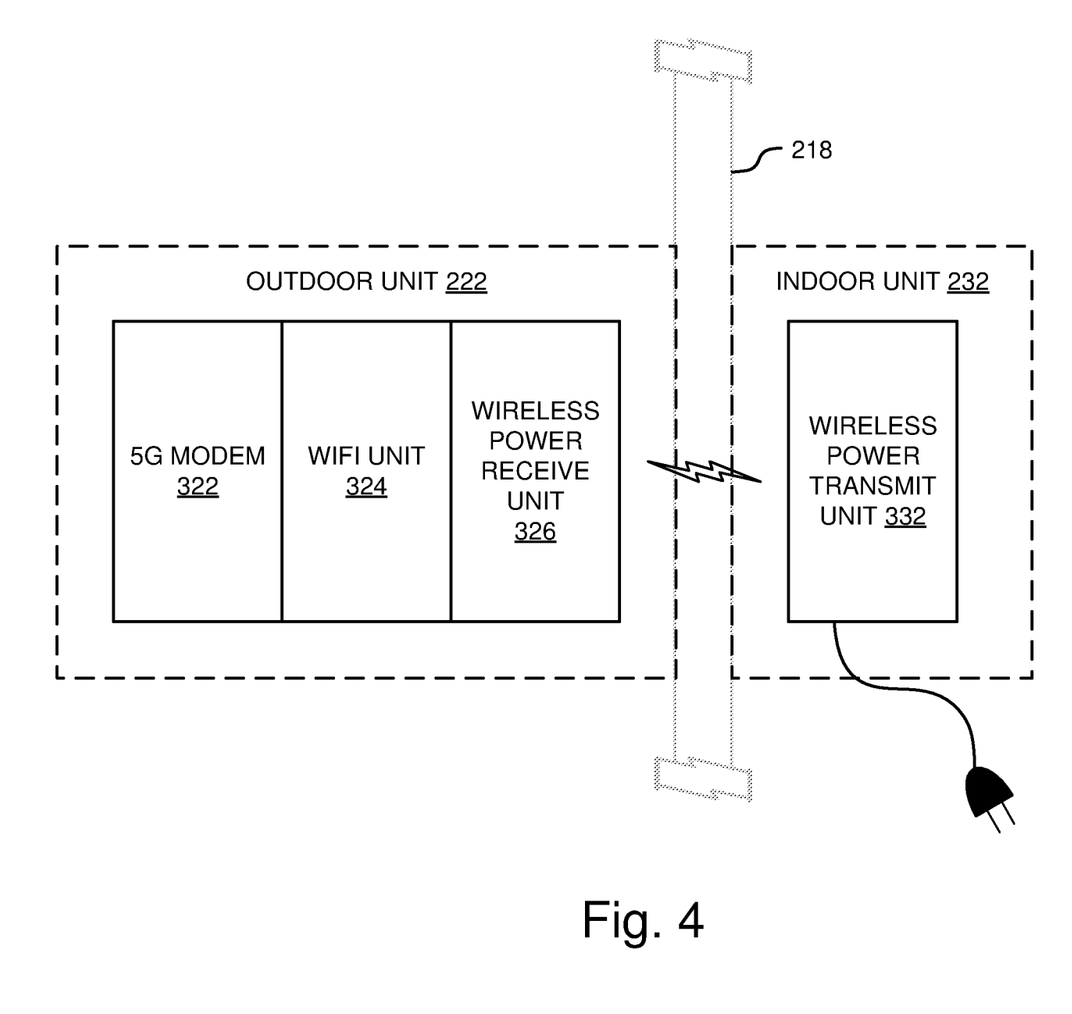
FIG. 4 illustrates an example implementation for an indoor/outdoor 5G wireless access point in accordance with one embodiment.

FIG. 4 is a representative block diagram illustrating an example implementation for an indoor/outdoor 5G wireless access point including a 5G modem and wireless router in accordance with one embodiment. In this example, outdoor unit 222 includes a 5G modem 322, a Wi-Fi unit 324 and a wireless power receive unit 326. Indoor unit 232 includes a wireless power transmit unit 332. In various applications, 5G modem 322 includes a 5G PHY (PHYsical layer) coupled to antenna to transmit and receive 5G signals between 5G modem 322 and the 5G base station. This may include a wireless transceiver to communicate with 5G base stations over 5G wireless networks. It also may include a wired or wireless communication interface to communicate with Wi-Fi unit 324.

Wi-Fi unit 324 may include a 5G Wi-Fi router that includes a communications interface to communicate with 5G modem 322 and a Wi-Fi router to communicate with devices within or proximate to the building. The communications interface to communicate with 5G modem 322 may be implemented as a hardwired or wireless communications interface, and may be configured to receive from 5G modem 322 information received and demodulated by 5G modem 322, and to send information to 5G modem 322 to be modulated onto a carrier and sent to a 5G base station.

The wireless Wi-Fi router is included to support Wi-Fi clients within or proximate to the building (e.g. building 151). This wireless Wi-Fi router connects devices within or proximate to the building with one another and to the 5G network by exchanging data packets among them. The wireless Wi-Fi router can share data packets among the devices or between the devices and the 5G network. In some embodiments, Wi-Fi unit 324 may also include a wired router to allow devices to be connected to the network using a wired connection such as fiber, CAT5, or other wired connection.

Wireless power receive unit 326 included with outdoor unit 222 is also mounted outside the building with the other external components. Wireless power receive unit 326 includes a power receiver module, such as a receive coil or coils, to receive time varying electromagnetic signals from wireless power transmit unit 332 and to convert the received time varying electromagnetic signals into an AC current. A rectifier can be included to convert this AC power into DC power to provide DC current and voltage to Wi-Fi unit 324, 5G modem 322 and other components of wireless power receive unit 326. Voltage regulators can be provided with wireless power receive unit 326, Wi-Fi unit 324 and 5G modem 322 to provide DC voltages at the correct voltage level for the modules powered by wireless power receive unit 326. In various implementations, wireless power receive unit 326 is configured to provide sufficient power to completely power outdoor unit 222 such that other external sources of power are not required. This can be implemented to allow outdoor unit 222 to be installed in a plug-and-play fashion without requiring cable or wiring. Outdoor unit 222 can be completely contained in a hermetically sealed housing with only wireless communication and power interfaces such that physical wires or cables need not be accommodated. This provides for a cleaner look, streamlined installation, greater packaging integrity and increased reliability of Outdoor unit 222.

In this example, indoor unit 232 includes only a wireless power transmit unit 332. In this example, wireless power transmit unit 332 receives power from an external power source such as, for example, an AC mains circuit of the building. Other power sources may also be provided depending on the application or installation. Wireless power transmit unit 332 can perform power conditioning or conversion as necessary or desired. AC power is provided to a power transmit module such as a transmit coil or coils which generates the time varying electromagnetic field used to transfer energy to and induce power in wireless power receive unit 326.

Figure 5:
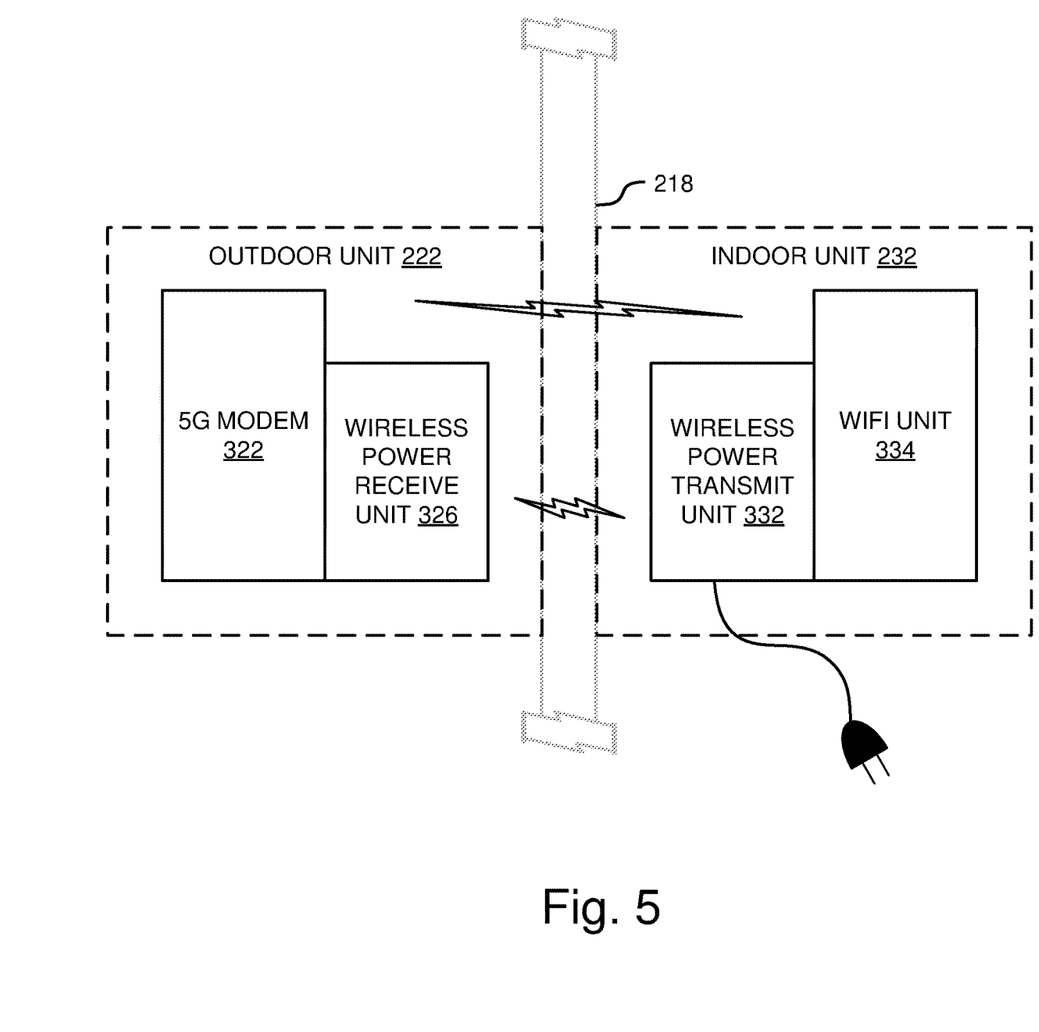
FIG. 5 illustrates another example implementation for an indoor/outdoor 5G wireless access point in accordance with one embodiment.

FIG. 5 is a representative block diagram illustrating another example implementation for an indoor/outdoor wireless access point in accordance with one embodiment. In this example, the Wi-Fi unit 334 is located in the interior of the building and provided as part of indoor unit 232. Here, 5G modem 322 transfers data to and from Wi-Fi unit 334 using a wireless communications interface. Any of a number of different wireless communication technologies or protocols can be used to implement the wireless interface between 5G modem 322 and Wi-Fi unit 334. In one example, this wireless interface is implemented using wideband RF capture technology combined with an OFDM baseband modem to transfer this data. In other embodiments, other communication standards may be used to provide wireless data transfer between 5G modem 322 and Wi-Fi unit 334. In some embodiments, the interface between 5G modem 322 and Wi-Fi unit 334 may be made by a hardwired connection. However, in the illustrated example, the interface is accomplished without a hardwired connection.

The example of FIG. 5 also includes wireless power transmit unit 332 and wireless power receive unit 326 to provide power from indoor unit 232 to outdoor unit 222 so that outdoor unit 222 does not need a separate external source of power. This can be implemented to eliminate the need for a hardwired power transfer interface between indoor unit 232 and outdoor unit 222. In contrast to the example of FIG. 4, in the example of FIG. 5, wireless power receive unit 326 supplies power to 5G modem 322, but not to the Wi-Fi unit. In this example, wireless power transmit unit 332 provides power to Wi-Fi unit 334 by a hardwired power interface. Because wireless power transmit unit 332 is collocated with Wi-Fi unit 334 within indoor unit 232, the components may be positioned adjacent to one another and in sufficiently close proximity such that wireless power transmit unit 332 may be configured to transmit power wirelessly to Wi-Fi unit 334 using transmit and receive coils in the respective units.

Similarly, in some implementations wireless power receive unit 326 transfers power to 5G modem 322 via a hardwired power transfer interface. Because wireless power receive unit 326 is collocated and may be positioned in close proximity to 5G modem 322, wireless power receive unit 326 may be configured to transmit power wirelessly to 5G modem 322 using transmit and receive coils in the respective units. For example, wireless power receive unit 326 may further include one or more transmit coils to transmit wireless power to corresponding receive coils that may be included in 5G modem 322 and Wi-Fi unit 324.

As the above illustrated examples demonstrate, embodiments can be implemented in which there is no wired connection between outdoor unit 222 and indoor unit 232. Advantages that might be achieved in some implementations by eliminating a hardwired connection between outdoor unit 222 indoor unit 232 is the avoidance of the requirement to drill a hole through the building or otherwise route a cable or other hardwired interface between outdoor unit 222 indoor unit 232. This can also yield a more simplified installation process that in some instances may be accomplished by the end user rather than a professional installer. Other benefits of this embodiment with the Wi-Fi unit 334 indoors may include in various applications: a) reduced interference with 5G modem; b) reduced interference with wireless power receive coil & metal shield; c) improved flexibility for placement of the Wi-Fi antennas; and d) better Wi-Fi throughput performance because the signal is not attenuated by the building structure.

Figure 6:
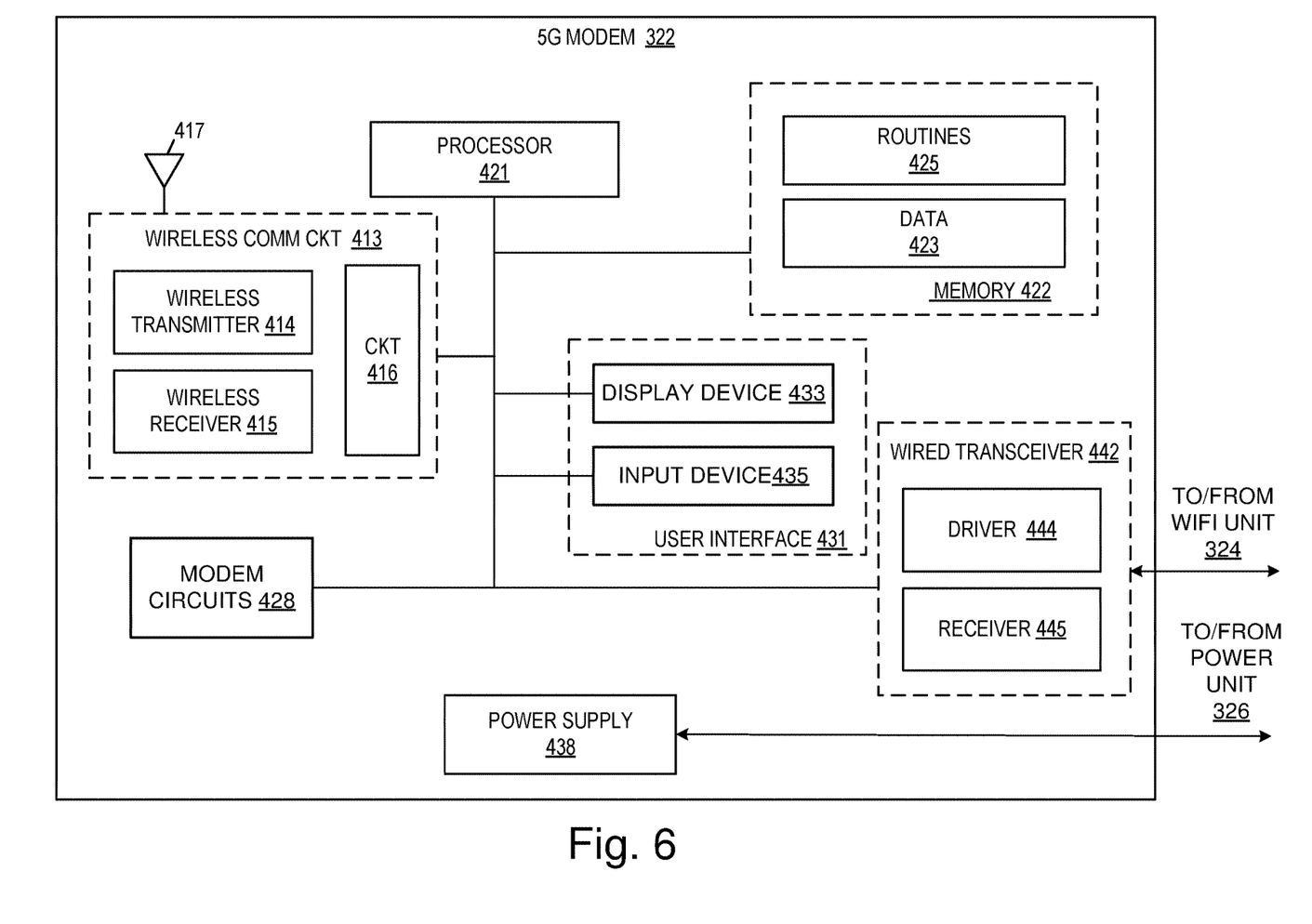
FIG. 6 illustrates an example implementation of a 5G modem that exchanges data with a Wi-Fi unit by a hardwired interface.

In the example described above with reference to FIG. 4, 5G modem 322 transfers data to/from Wi-Fi unit 324 via a wired or wireless communication interface. FIG. 6 illustrates an example implementation of a 5G modem 322 that exchanges data with a Wi-Fi unit by a hardwired interface. This example of 5G modem 322 includes a processor 421, memory 422, user interfaces in the form of a display device 433 and an input device 435, modem circuits 428, power supply circuits 438, a 5G wireless communication circuit 413 and a wired transceiver 442. Processor 421 may be implemented as a dedicated or general-purpose processor or combination of processors or computing devices to carry out instructions and process data. For example, processor 421 accesses memory 422 to carry out instructions, including routines 425, using data including data 423. Processor 421 may include one or more single core, dual core, quad core or other multi-core processors. Processor 421 may be implemented using any processor or logic device, such as a complex instruction set computer (CISC) microprocessor, a reduced instruction set computing (RISC) microprocessor, a very long instruction word (VLIW) microprocessor, a processor implementing a combination of instruction sets, or other processing device. Other modem circuits 428 may be provided to perform other modem functions.

Memory 422 includes memory locations for storing instructions or other routines 425 and data 423. Memory 422 may be implemented using any machine-readable or computer-readable media to store data and instructions, including volatile and nonvolatile memory. Memory may be implemented, for example, as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory or other solid state memory, polymer memory, ferroelectric memory, silicon-oxide-nitride-oxide-silicon (SONOS) memory, holographic or other optical storage, or other memory structures. Although memory 422 is illustrated as a separate component in FIG. 6, part or all of memory 422 can be implemented on the same integrated circuit as processor 421 or otherwise form part or all of embedded memory of processor 421.

Wireless communication circuit 413 includes a wireless transmitter 414, a wireless receiver 415, communication circuitry 416 and antenna 417. Communication circuitry 416 may be implemented as a communications processor using any suitable processor logic device to provide appropriate communications operations such as, for example, baseband processing, modulation and demodulation, and other wireless communication operations. Where certain operations such as modulation and demodulation are performed in the digital domain, analog-to-digital and digital-to-analog conversion circuitry can be included to provide the appropriate interfaces between communication circuitry 416 and wireless transmitter 414 and wireless receiver 415.

Wired transceiver 442 may be included to provide a hardwired communications interface between 5G modem 322 and Wi-Fi unit 324. The illustrated example includes a driver circuit 444 to transmit data to Wi-Fi unit 324 and a receiver circuit for 445 to receive data from Wi-Fi unit 324. Using wired transceiver 442, data received from the 5G network intended for devices served by Wi-Fi unit 324 can be transferred from 5G modem 322 to Wi-Fi unit 324. Similarly, wired transceiver 442 can receive data from devices served by Wi-Fi unit 324 and provide that data to other components of 5G modem 322 for processing and transmission to the 5G network.

The user interface 431 in this example includes a display device 433 and an input device 435. Display device may include, for example, one or more LEDs; display screens, touch screens, or other alphanumeric displays, or other display devices to communicate data or other information to a user. Input device 435 may include buttons, a keypad, a touchscreen display, or other input device to accept input from a user. Display device 433 and input device 435 may include attendant circuitry such as drivers, receivers and processing or control circuitry to enable operation of the devices with 5G modem 322.

Figure 7:
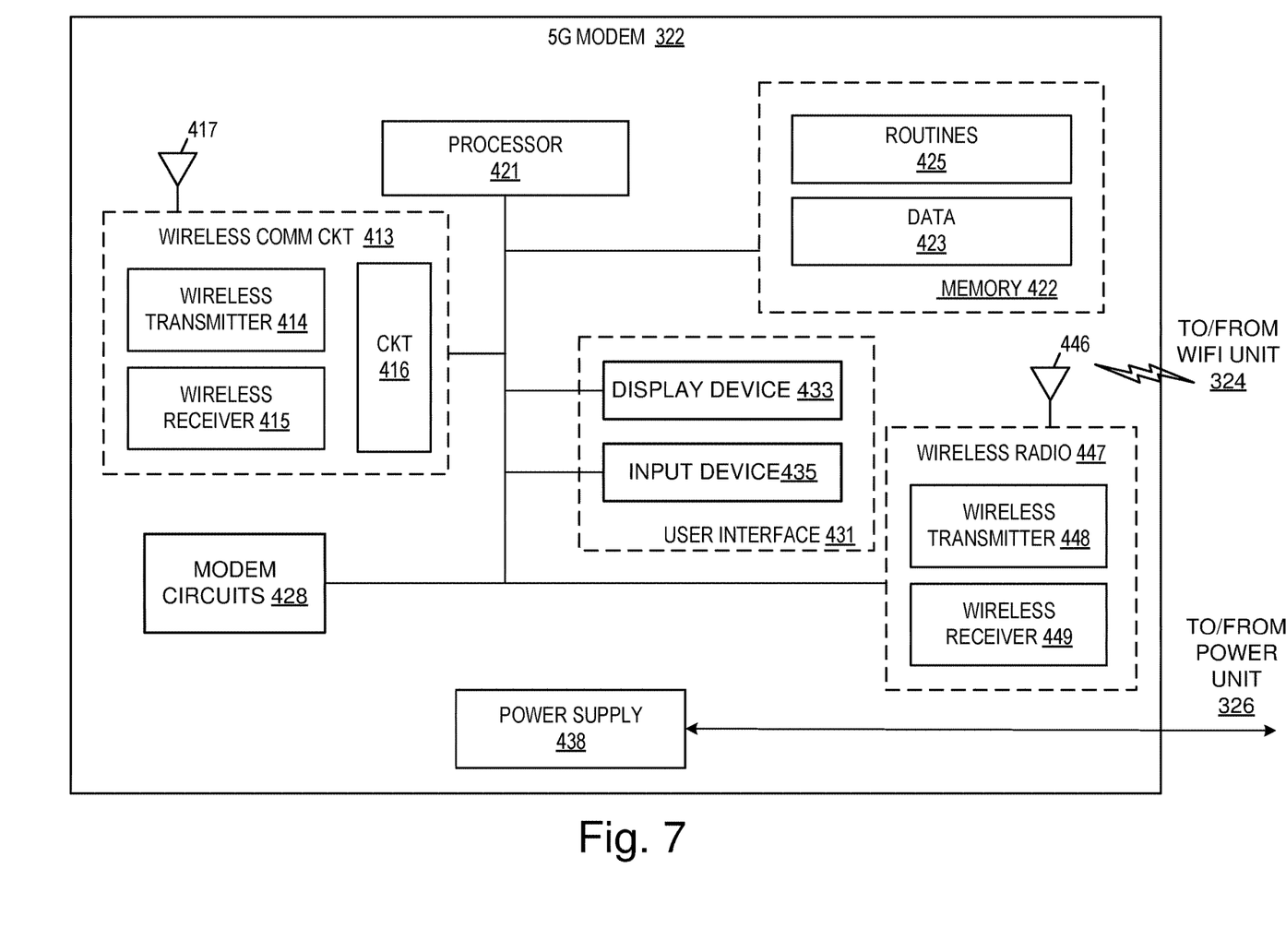
FIG. 7 illustrates another example implementation of a 5G modem in accordance with one embodiment.

Although illustrated in the examples of FIG. 6 (or 7) as part of 5G modem 322, user interface 431 may be implemented as part of outdoor unit 222 or indoor unit 232 rather than specifically as part of 5G modem 322. User interface 431 can provide a user interface to control operation of the entire modem/router unit, rather than just 5G modem 322 or Wi-Fi unit 324 or the wireless power transmit unit and receiver. This user interface 431 may also be implemented using a separate device such as an app running on a smart phone, tablet, or other computing system. Accordingly, user interface 431 may include a wired or wireless communication interface to communicate with the smart phone, tablet or computing system running the app.

Power supply circuits 438 can be included to provide power conditioning or power conversion for components of 5G modem 322. For example, power supply can supply power to different components of 5G modem 322 at specific voltage and current levels appropriate for those components. Power supply circuits 438 in this example receives power from wireless power receive unit 326. In some embodiments, power inputs at the specific voltage and current levels for the modem components can be provided by wireless power receive unit 326 to reduce or eliminate the need for power supply circuits 438 on 5G modem 322.

FIG. 7 illustrates another example implementation of a 5G modem in accordance with one embodiment. This example implementation can be used to communicate wirelessly with Wi-Fi units 324, 334 via a wireless communication transceiver. This implementation can be used, for example, with the embodiment discussed above with reference to FIG. 5, in which a wireless interface is implemented between 5G modem 322 and Wi-Fi unit 334, using a wireless radio 447. In this example, the wired transceiver 442 of the example implementation in FIG. 6 is replaced (or augmented) by a wireless radio 447 that includes a wireless transmitter 448, a wireless receiver 449, an antenna 446 and associated circuitry to allow wireless communications between 5G modem 322 and Wi-Fi unit 334. As noted above, in one embodiment this wireless communication can be implemented using wideband RF capture technology combined with an OFDM baseband modem to transfer this data. In other embodiments, other communication standards may be used to provide wireless data transfer between 5G modem 322 and Wi-Fi unit 334. Using wireless radio 447 along with wireless power transfer, the interface between outdoor unit 222 and indoor unit 232 can implemented without a hardwired connection between the two units.

Figure 8:
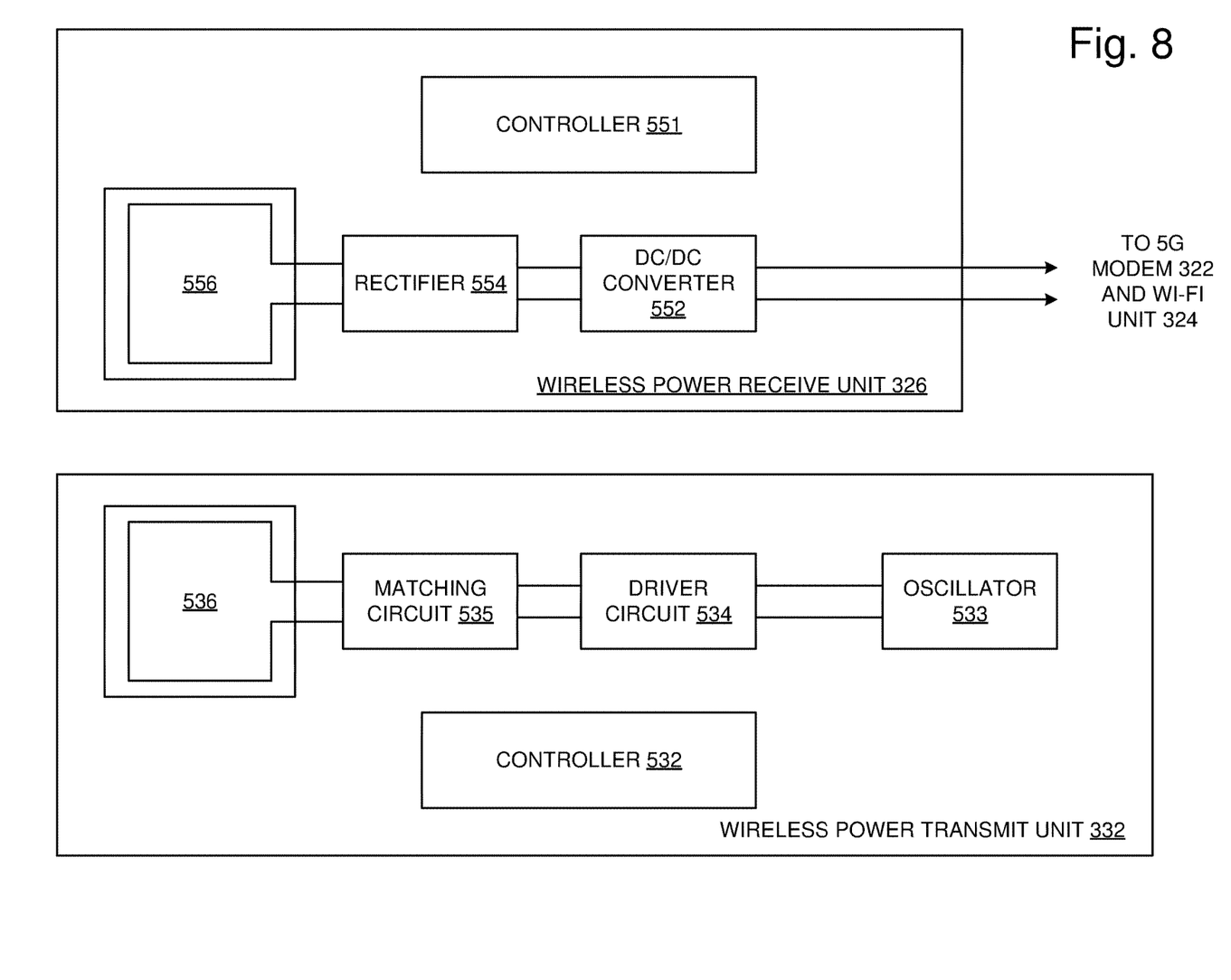
FIG. 8 illustrates an example of a wireless power transfer system in accordance with one embodiment.

FIG. 8 illustrates an example of a wireless power transfer system in accordance with one embodiment. Particularly, this diagram illustrates one example of a limitation of a wireless power receive unit 326 and a wireless power transmit unit 332. Wireless power transmit unit 332 may include a controller 532, oscillator 533, driver circuit 534, matching circuit 535 and transmit coil 536. Oscillator 533 may be configured to generate a signal at a desired frequency to excite transmit coil 536. Any of a number of frequencies can be selected and the selection can be controlled by controller 532. Frequencies selected may be resident frequencies of transmit coil 536. The oscillator signal can be provided to driver circuit 534 to drive transmit coil 536 with sufficient power to provide adequate energy transfer from transmit coil 536 to the wireless power receive unit 326. In some embodiments, driver circuit 534 may be a switching amplifier that receives a square wave from oscillator 533 and outputs a sine wave. This example also includes a matching circuit 535 to match the impedance of the circuit to transmit coil 536. Although not illustrated, a filter can also be provided to filter out harmonics or other unwanted frequencies or noise. Controller 532 may also control driver circuit 534, matching circuit 535 and the filters. Controller 532 may be used to control the level of power provided to the coil and hence the power level of the electromagnetic power signal transmitted to wireless power receive unit 326.

Wireless power receive unit 326 in this example includes receive coil 556, a rectifier 554, a DC/DC converter 552 and a controller 551. Wireless power receive unit 326 may also include a matching circuit (not shown) to match the impedance of receive coil 556 to the receiver. Rectifier 554 receives the alternating current signal from the antenna and generates a DC power output from the AC power input to provide a source of power to outdoor unit 222. One or more DC/DC converters can be included to provide voltages at the voltage levels required by various components of the outdoor unit. Controller 551 can be included to control the outputs of DC/DC converter 552 and other aspects of wireless power receive unit 326.

Although not illustrated, wireless power receive unit 326 and wireless power transmit unit 332 may communicate with one another via a separate communication channel. For example, a Bluetooth, Zigbee, or other wireless communication link that may be established between the two units. Additionally, data can be modulated onto the AC signal used to drive transmit coil 536 and demodulated on the receive side to allow data transfer between wireless power transmit unit 332 and wireless power receive unit 326.

Transmit coil 536 and receive coil 556 may be implemented as a magnetic antenna or induction coil to wirelessly output (in the case of transmit coil 536) or receive (in the case of receive coil 556) electromagnetic energy. Transmit coil 536 and receive coil 556 may be implemented to include an air core or a ferrite or other physical core.

Implementations may be provided in which the power provided by transmit coil 536 can be scaled based on parameters of the installation. For example, different thicknesses of building components (e.g., windows, walls, etc.), different materials used for the building components (e.g., building materials, metallic films, etc.) and other building component parameters may provide different levels of shielding between wireless power transmit unit 332 and wireless power receive unit 326. In some embodiments, handshaking between wireless power transmit unit 332 and wireless power receive unit 326 can be used to report received power levels and to adjust transmit power levels accordingly. This can be done upon set up and it can be done on a periodic or regular basis during operations. In some embodiments, power adjustment can be provided at the user set up parameter.

The terms "substantially" and "about" used throughout this disclosure, including the claims, are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

The term "coupled" refers to direct or indirect joining, connecting, fastening, contacting or linking, and may refer to various forms of coupling such as physical, optical, electrical, fluidic, mechanical, chemical, magnetic, electromagnetic, optical, communicative or other coupling, or a combination of the foregoing. Where one form of coupling is specified, this does not imply that other forms of coupling are excluded. For example, one component physically coupled to another component may reference physical attachment of or contact between the two components (directly or indirectly), but does not exclude other forms of coupling between the components such as, for example, a communications link (e.g., an RF or optical link) also communicatively coupling the two components. Likewise, the various terms themselves are not intended to be mutually exclusive. For example, a fluidic coupling, magnetic coupling or a mechanical coupling, among others, may be a form of physical coupling.

Figure 9:
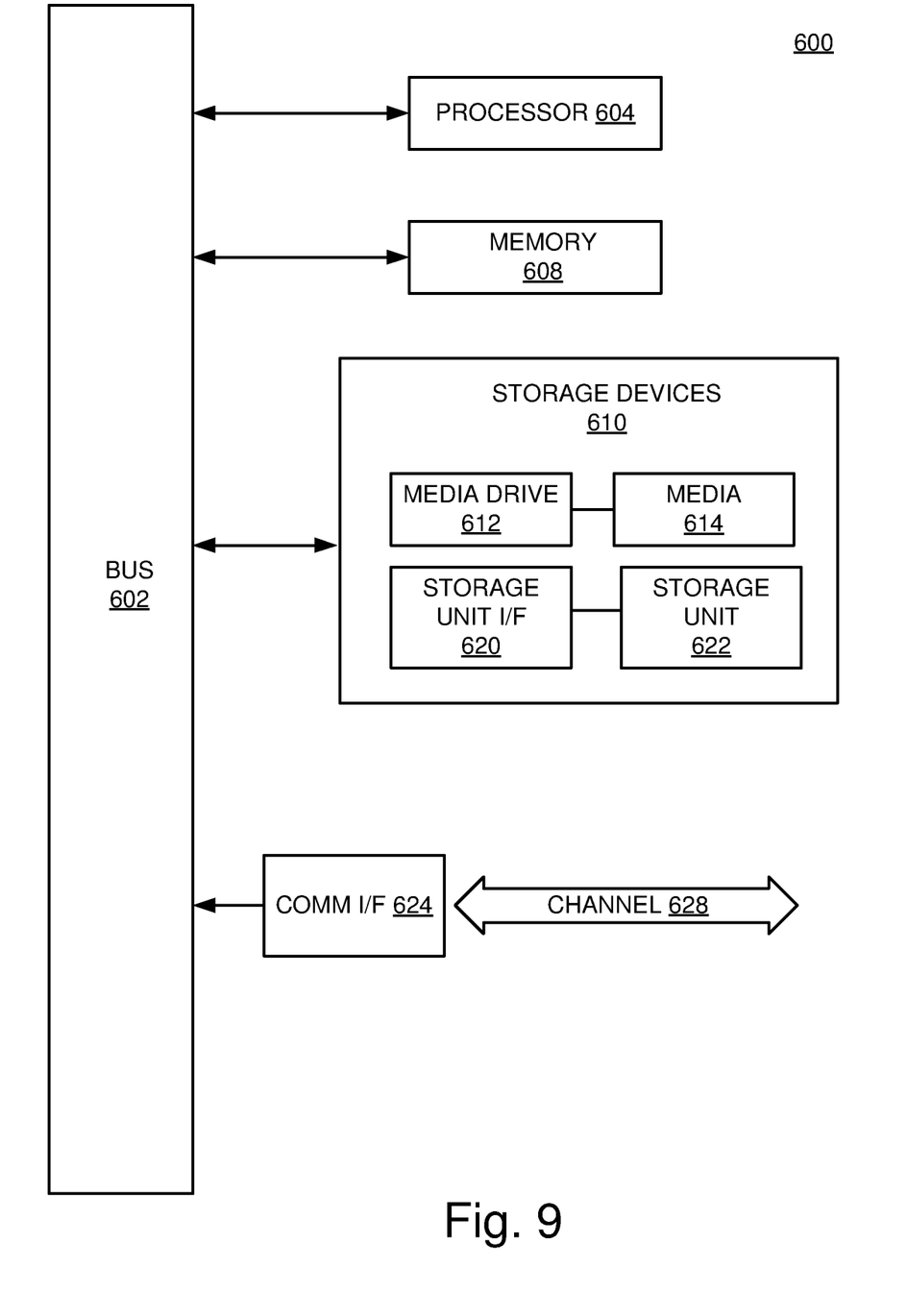
FIG. 9 illustrates an example computing module that may be used in implementing various features of embodiments of the disclosed technology.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. In other words, as would be apparent to one of ordinary skill in the art after reading this description, the various features and functionality described herein may be implemented in any given application and can be implemented in one or more separate or shared circuits in various combinations and permutations. Even though various features or elements of functionality may be individually described or claimed as separate circuits, one of ordinary skill in the art will understand that these features and functionality can be shared among one or more common circuits, and such description shall not require or imply that separate circuits are required to implement such features or functionality.

Where circuits are implemented in whole or in part using software, in one embodiment, these software elements can be implemented to operate with a computing or processing system capable of carrying out the functionality described with respect thereto. One such example computing system is shown in FIG. 9. Various embodiments are described in terms of this example-computing system 600. After reading this description, it will become apparent to a person skilled in the relevant art how to implement the technology using other computing systems or architectures.

Referring now to FIG. 9, computing system 600 may represent, for example, computing or processing capabilities found within desktop, laptop and notebook computers; hand-held computing devices (smart phones, cell phones, palmtops, tablets, etc.); mainframes, supercomputers, workstations or servers; or any other type of special-purpose or general-purpose computing devices as may be desirable or appropriate for a given application or environment. Computing system 600 might also represent computing capabilities embedded within or otherwise available to a given device. For example, a computing system might be found in other electronic devices such as, for example, digital cameras, navigation systems, cellular telephones, portable computing devices, modems, routers, WAPs, terminals and other electronic devices that might include some form of processing capability.

Computing system 600 might include, for example, one or more processors, controllers, control modules, or other processing devices, such as a processor 604. Processor 604 might be implemented using a general-purpose or special-purpose processing engine such as, for example, a microprocessor (whether single-, dual- or multi-core processor), signal processor, graphics processor (e.g., GPU) controller, or other control logic. In the illustrated example, processor 604 is connected to a bus 602, although any communication medium can be used to facilitate interaction with other components of computing system 600 or to communicate externally.

Computing system 600 might also include one or more memory modules, simply referred to herein as main memory 608. For example, in some embodiments random access memory (RAM) or other dynamic memory, might be used for storing information and instructions to be executed by processor 604. Main memory 608 might also be used for storing temporary variables or other intermediate information during execution of instructions to be executed by processor 604. Computing system 600 might likewise include a read only memory ("ROM") or other static storage device coupled to bus 602 for storing static information and instructions for processor 604.

The computing system 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a floppy disk drive, a magnetic tape drive, an optical disk drive, a CD or DVD drive (R or RW), a flash drive, or other removable or fixed media drive might be provided. Accordingly, storage media 614 might include, for example, a hard disk, a floppy disk, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing system 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory module) and memory slot, a flash drive and associated slot (for example, a USB drive), a PCMCIA slot and card, and other fixed or removable storage units 622 and interfaces 620 that allow software and data to be transferred from the storage unit 622 to computing system 600.

Computing system 600 might also include a communications interface 624. Communications interface 624 might be used to allow software and data to be transferred between computing system 600 and external devices. Examples of communications interface 624 might include a modem or softmodem, a network interface (such as an Ethernet, network interface card, WiMedia, IEEE 802.XX, Bluetooth® or other interface), a communications port (such as for example, a USB port, IR port, RS232 port, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 608, storage unit 622, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing system 600 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various example embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described example embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of example block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A 5G wireless access point, comprising:
   an outdoor unit comprising a 5G modem and a wireless power receive unit, and configured to be affixed to an exterior surface of a building component of a building;
   an indoor unit comprising a wireless power transmit unit and configured to be affixed to an interior surface of the building component at a location opposite the outdoor unit on an interior surface of the building component; and
   a Wi-Fi router communicatively coupled to the 5G modem and configured to transmit or receive information wirelessly with a device within the building;

wherein the wireless power transmit unit of the indoor unit provides power to operate the outdoor unit via a wireless link between the wireless power transmit unit and the wireless power receive unit, and wherein the 5G wireless access point is configured to determine a level of power required at a transmit coil of the wireless power transmit unit to transmit sufficient energy from the wireless power transmit unit to the wireless power receive unit and to dynamically adjust the power level of the wireless power transmit unit based on the determined level of power required.

2. The 5G wireless access point of claim 1, wherein the Wi-Fi router is located in the outdoor unit.

3. The 5G wireless access point of claim 1, wherein the Wi-Fi router is located in the indoor unit.

4. The 5G wireless access point of claim 3, wherein the 5G modem and the Wi-Fi router further comprise a wireless interface to exchange data wirelessly between the 5G modem in the outdoor unit and the Wi-Fi router in the indoor unit.

5. The 5G wireless access point of claim 4, wherein as a result of wireless coupling between the outdoor unit and the indoor unit, the 5G wireless access point is configured to be installed without requiring physical penetration of the building component.

6. The 5G wireless access point of claim 1, wherein the 5G modem is configured to be mounted external to the building such that the 5G modem receives millimeter wave 5G signals without requiring those millimeter wave 5G signals to penetrate the building.

7. The 5G wireless access point of claim 6, wherein the 5G wireless access point is configured to be installed without requiring physical penetration of the building component.

8. The 5G wireless access point of claim 1, wherein the building component comprises an exterior window, wall or door of the building.

9. A method of operation of a 5G wireless access point comprising an outdoor unit affixed to an exterior surface of a building component of a building and an indoor unit affixed to an interior surface of the building component opposite the outdoor unit on an interior surface of the building component, the method comprising:
 a wireless power transmit unit of the indoor unit of the 5G wireless access point receiving power from a power source, energizing a wireless power transmitting unit with the received power, and transmitting AC power from the power transmitting unit;
 a wireless power receive unit of the outdoor unit of the 5G wireless access point receiving AC power transmitted from the wireless power transmit unit, using this received AC power to provide power to a 5G wireless modem of the outdoor unit;
 the 5G modem of the outdoor unit receiving 5G wireless signals containing data from a 5G base station and transferring the data received by the 5G modem to a Wi-Fi router;
 the 5G wireless access point determining a level of power required at a transmit coil of the wireless power transmit unit to transmit sufficient energy from the wireless power transmit unit to the wireless power receive unit to power the wireless receive unit, wherein the determining comprises the wireless power receive unit measuring a magnetic field strength of energy received at the wireless power receive unit to determine whether the level of power at a transmit coil of the wireless power transmit unit is sufficient to transmit sufficient energy from the wireless power transmit unit to the wireless power receive unit; and
 the Wi-Fi router transmitting the transferred data received from the 5G modem wirelessly to devices within the building.

10. The method of claim 9, wherein the Wi-Fi router is located at the indoor unit, and wherein the 5G modem transferring data in the 5G wireless signals received by the 5G modem to the Wi-Fi router, comprises modulating the data onto a wireless carrier and transmitting the data wirelessly to the Wi-Fi router at the indoor unit.

11. The method of claim 9, wherein the Wi-Fi router is located at the outdoor unit, and wherein the 5G modem transferring data in the 5G wireless signals received by the 5G modem to the Wi-Fi router, comprises transmitting the data over a wired or wireless interface to the Wi-Fi router at the outdoor unit.

12. The method of claim 9, wherein the building component comprises an exterior window, wall or door of the building.

13. The method of claim 9, further comprising dynamically adjusting the power level of the wireless power transmit unit based on the determined level of power required.

14. The method of claim 9, further comprising the wireless power receive unit transmitting information to the wireless power transmit unit, the information indicating the measured magnetic field strength of the energy received at the wireless power receive unit.

15. The method of claim 14, wherein the wireless power receive unit transmitting information to the wireless power transmit unit comprises the wireless power receive unit transmitting across a wireless communication link between the wireless power receive unit and the wireless power transmit unit.

16. A method of operation of a 5G wireless access point comprising an outdoor unit affixed to an exterior surface of a building component of a building and an indoor unit affixed to an interior surface of the building component opposite the outdoor unit on an interior surface of the building component, the method comprising:
 a wireless power transmit unit of the indoor unit of the 5G wireless access point receiving power from a power source, energizing a wireless power transmitting unit with the received power, and transmitting AC power from the power transmitting unit;
 a wireless power receive unit of the outdoor unit of the 5G wireless access point receiving AC power transmitted from the wireless power transmit unit, using this received AC power to provide power to a 5G wireless modem of the outdoor unit;
 the 5G modem of the outdoor unit receiving 5G wireless signals containing data from a 5G base station and transferring the data received by the 5G modem to a Wi-Fi router;
 the 5G wireless access point determining a level of power required at a transmit coil of the wireless power transmit unit to transmit sufficient energy from the wireless power transmit unit to the wireless power receive unit and dynamically adjusting a power level of the wireless power transmit unit based on the determined level of power required, and
 the Wi-Fi router transmitting the transferred data received from the 5G modem wirelessly to devices within the building.

17. The method of claim 16, wherein the Wi-Fi router is located at the indoor unit, and wherein the 5G modem transferring data in the 5G wireless signals received by the 5G modem to the Wi-Fi router, comprises modulating the data onto a wireless carrier and transmitting the data wirelessly to the Wi-Fi router at the indoor unit.

18. The method of claim 16, wherein the Wi-Fi router is located at the outdoor unit, and wherein the 5G modem transferring data in the 5G wireless signals received by the 5G modem to the Wi-Fi router, comprises transmitting the data over a wired or wireless interface to the Wi-Fi router at the outdoor unit.

19. The method of claim 16, wherein the building component comprises an exterior window, wall or door of the building.

20. A 5G wireless access point, comprising:
  an outdoor unit comprising a 5G modem and a wireless power receive unit, and configured to be affixed to an exterior surface of a building component of a building;
  an indoor unit comprising a wireless power transmit unit and configured to be affixed to an interior surface of the building component at a location opposite the outdoor unit on an interior surface of the building component; and
  a Wi-Fi router communicatively coupled to the 5G modem and configured to transmit or receive information wirelessly with a device within the building;
  wherein the wireless power transmit unit of the indoor unit provides power to operate the outdoor unit via a wireless link between the wireless power transmit unit and the wireless power receive unit, and wherein the 5G wireless access point determines a level of power required at a transmit coil of the wireless power transmit unit to transmit sufficient energy from the wireless power transmit unit to the wireless power receive unit to power the wireless receive unit, further wherein the determining comprises the wireless power receive unit measuring a magnetic field strength of energy received at the wireless power receive unit to determine whether the level of power at a transmit coil of the wireless power transmit unit is sufficient to transmit sufficient energy from the wireless power transmit unit to the wireless power receive unit.

21. The method of claim 20, wherein the wireless power receive unit is further configured to transmit information to the wireless power transmit unit, the information indicating the measured magnetic field strength of the energy received at the wireless power receive unit.

* * * * *